United States Patent [19]
Pareja

[11] 3,894,556
[45] July 15, 1975

[54] PRESSURE LIMITING VALVE
[75] Inventor: Ramon Pareja, Minneapolis, Minn.
[73] Assignee: Lear Siegler, Inc., Santa Monica, Calif.
[22] Filed: Jan. 2, 1974
[21] Appl. No.: 429,902

[52] U.S. Cl............................ 137/539; 137/543.19
[51] Int. Cl............................................ F16k 15/04
[58] Field of Search........... 137/539, 539.5, 543.19, 137/535, 540, 516, 524

[56] References Cited
FOREIGN PATENTS OR APPLICATIONS
849,370  8/1939  France................................ 137/539
1,011,376  11/1965  United Kingdom................. 137/535

Primary Examiner—William R. Cline
Attorney, Agent, or Firm—Orrin M. Haugen, Esq.

[57] ABSTRACT

A pressure limiting valve assembly comprising a valve chamber having an inlet and an outlet, and a spring biased ball check seated adjacent the inlet. Cage means are disposed within the housing, with the cage means having a seat formed in the base thereof, and with the ball check being arranged to rest upon said seat. The valve housing includes two generally cylindrical tubular members which are telescopically engaged, one with the other, and with a bore extending entirely through the tubular members. The cage means is provided with one or more metering orifices along the side walls thereof, with the metering orifices being disposed at a certain axial distance from the seat. The force urging the ball check into contact with the seat is adjustably controlled by the extent of telescopic engagement of the first and second tubular members, and locking means are provided for retaining said members in predetermined telescopic engagement.

9 Claims, 3 Drawing Figures 3,894,556

PRESSURE LIMITING VALVE

BACKGROUND OF THE INVENTION

The present invention relates generally to an improved pressure limiting valve for use with pumps, and particularly to use in combination with positive displacement pumps. Essentially, the valve structure of the present invention, in addition to limiting pressure, also functions as a relief valve for diverting a portion of the output of the pump either to the supply, a drain, or directly to the inlet of the pump. The valve structure of the present invention is preferably designed to bypass all of the pump capacity upon demand. Thus, in a typical application, such as in a coin-operated car wash facility, the pressure limiting valve will bypass the entire pump capacity whenever the output of the system is shut off at the nozzle. In these instances, with the system entirely shut off, the pressure at the pump and at the shut-off valve, such as a trigger-type spray wand, will fall to a pressure which is not sufficiently high so as to damage the pump or other components of the system.

The valve of the present invention also is capable of functioning as a relief valve so as to protect the system from excessive pressures which may develop due to a partially or completely closed or plugged system. In this instance, liquid in the system will be diverted as previously indicated, with pressure in the system as well as flow returning to normal upon removal of the obstruction which has caused the development of a plugged nozzle.

In the past, pressure limiting valves as well as relief valves of this type have been available which normally utilize a valve body having a poppet member therein, with a spring providing a bias force against the poppet to cause it to remain seated during normal operation. When pressure builds up in the system sufficiently so that the force against the poppet exceeds the compressive force of the spring, the valve poppet will open and a bypass will function. For most production purposes, and for normal requirements of precision, the springs selected for the operation are held and maintained within fairly close tolerance limits. Minor variations in spring length, spring biasing forces, as well as the immediate configuration of the terminal helices may cause significant variations to occur in the performance of the finished product. Also, in order to provide for proper valve design, spring forces, metering orifice areas, as well as other parameters must be individually considered before finalizing the product design. Normally, variations in performance are achieved by modifications in components as well as component configurations such as orifice areas and the like.

SUMMARY OF THE INVENTION

In accordance with the present invention, however, the design renders it possible to utilize a substantial number of identical components, or components having only minor variations, and yet achieve a variety of performance characteristics. In other words, it is possible to utilize the same housings, as well as the same retention components for a family of pressure limiting valves, wherein these valves have a wide range of predetermined and selective operating parameters. By discriminating and careful design of certain internal components, such as the ball-check or poppet-retaining cage, it is possible to change certain of the design characteristics of this component and thereby provide for a substantial number of variations in operating parameters. This versatility, therefore, makes it possible to provide for the availability of a family of valves having wide variations in performance, including variations in capacity as well as pressure parameters.

Therefore, it is a primary object of the present invention to provide an improved design for a pressure limiting valve which is capable of accommodating a substantial variety of design parameters, while employing many of the same components throughout.

It is yet a further object of the present invention to provide an improved design for pressure limiting valves which design permits the utilization of components having substantially wide manufacturing tolerances.

It is yet a further object of the present invention to provide an improved pressure limiting valve structure which is both positive and reliable in its operation, and which is designed for fast, efficient, and expeditious servicing.

Other and further objects of the present invention will become apparent to those skilled in the art upon a study of the following specification, appended claims, and accompanying drawing.

DESCRIPTION OF THE PREFERRED EMBODIMENT

Figure 3:
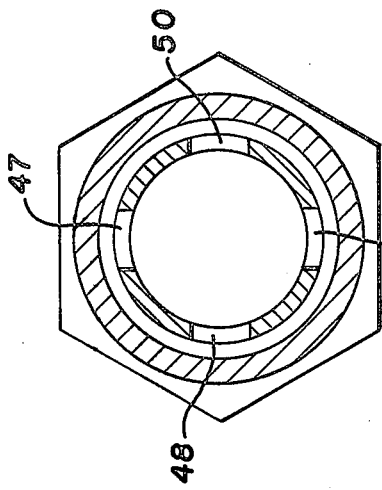
FIG. 3 is a vertical sectional view taken along the line and in the direction of the arrows 3—3 of FIG. 2.
Figure 1:
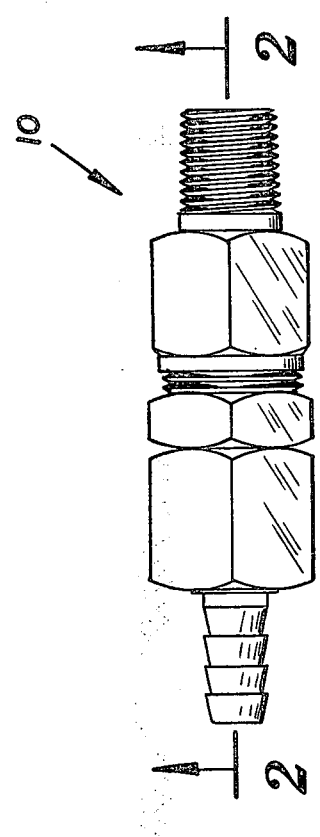
FIG. 1 is a side elevational view of the pressure limiting valve of the present invention.

In accordance with the preferred embodiment of the present invention, the pressure limiting valve means generally designated 10 comprises a valve housing generally designated 11, with the housing defining a chamber generally shown at 12 having an inlet 13 and an outlet 14, each of which are in communication with the chamber 12. A poppet in the form of a ball-check 16 is provided with spring means in the form of a resilient member 17 biasing the ball-check 16 into contact with seat 18 which is adjacent the port at the termination of inlet 13. Cage means 19 are disposed within the housing 11 and provide a ball-confining chamber as at 20 for operatively retaining the ball-check 16 in operative disposition within the chamber 12.

Turning now to the details of housing 11, a first generally cylindrical tubular member is provided as at 25, with a second generally tubular member being provided at 26. It will be appreciated that these elements are defined as being "tubular" in configuration, and this is intended to relate to the manner in which flow is arranged continuously through the members, that is, from the inlet 13, through the chamber 12, and ultimately outwardly through outlet 14. The inner ends of tubular members 25 and 26, as at 28 and 29 are telescopically engaged, one with the other, the arrangement being disclosed in greater detail hereinafter. Seals means are provided at 30 in order to seal chamber 12 from atmosphere. Cylindrical tubular member 25 has a counterbore formed therewithin, as at 32, with this counterbore extending outwardly of the first tubular member from the inner end 29. Tubular member 26 also has a counterbore formed therewithin, as at 35, with this counterbore also extending outwardly from the inner end 28, toward the outer end, such as at the outlet 14.

Clamping means are provided for retaining the tubular members 25 and 26 in proper pre-arranged disposition, these clamping means being in the form of a clamping nut 36, and a locking nut 37. Retainer ring 38 maintains the system intact, with retainer ring 38 being seated or maintained within an annular groove formed in the outer tip segment of tubular member 26. The extent to which clamping nut 36 is extended onto the exterior of tubular member 25 will determine the axial length of gap 39 which, in turn, will relate directly to the compressive force normally present in spring member 17.

With regard to spring 17, it will seen that spring 17 rests in the step abutment which is formed at the termination of counterbore 35, such as at 40, thus providing a positive base or seat for spring member 17.

Attention is now directed to the cage means 19 housing ball member 16. Cage means 19 is received within counterbore 32 formed within tubular member 25, and is seated against abutment surface 41 formed at the termination of counterbore 32. A seal is obtained between cage means 19 and tubular member 25 by virtue of O-ring 42. Cage means 19 is generally cup-shaped, and has external threads as at 43 which mate with similar internally disposed threads in member 25 along its counterbore zone 32.

With continued attention being directed to cage means 19, it will be seen that the cup-shaped body forming the cage means has a base portion as at 45, with side walls extending upwardly therefrom, as at 46. The arrangement provides a member with a generally open top. A bore is formed in base 45 as at 53, with this bore, as previously indicated, forming a portion of the inlet to the chamber 12. At least one metering bore is formed in the wall 46 of cage means 19, with four such bores being present in the embodiment illustrated, as at 47, 48, 49 and 50.

The flow area available in bore 53, as shown by dimension A, determines the overall capacity capability of the valve. The axial length described by dimension B determines, in part, the pressure response of the valve. In other words, the disposition of the metering orifice determines the pressure response of the device, particularly by virtue of the axial length of travel necessary for ball-check 16 prior to the actual opening of metering orifices 47-50 to establish a fluid circuit between inlet 13 and outlet 14. As the pressure continues to rise in the system, as sensed by ball-check 16, the ball-check will move further upwardly and expose a greater portion of the area of metering orifices 47-50, so as to establish the extent or degree of bypass fluid flowing through the device.

In a typical production arrangement, it is possible to control the design parameters such that the tubular housing members may be employed for a variety or family of pressure relief valves. The design of cage 19 determines the overall capacity of the valve in its by-pass mode, as well as the pressure response, the pressure response being, of course, a function of both the design of cage means 19 and the flexural characteristics of spring 17. Another operating parameter is the total of the annular area which exists between the outer periphery of the ball-check 16 and the inner periphery of cage means 19. In its closed position, the pressure in the system must be transmitted through the area of bore 53, however, upon reaching a pressure level in the system which is sufficient to overcome the mechanical bias of spring 17, ball-check 16 is moved away from seat 18 and the system then responds to the force across the entire cross-sectional area of ball-check 16, particularly taken at its diameter. Thus, upon initially opening, the ball-check 16 will move away from seat 18 sufficient to provide a dump-opening operation, with a resulting pressure drop in the system. With the annular area existing between the outer diameter of ball-check 16 and inner diameter of cage means 19 being equal to or less than the area A, ball-check 16 will remain stable in its unloading position. In other words, an equilibrium position will be achieved between ball-check 16 and the confines of cage 19, with the annular area available for flow being sufficient to hold the ball open against the spring. In certain instances, it may be desirable to utilize a larger annular area for unloading operations, with this arrangement being useful in connection with pumps having sufficient capacity to maintain ball-check 16 in an equilibrium position, so that ball 16 will not "hunt" by cycling between seat 18 and a position removed from seat 18.

It will be further observed that the annular area available between the outer periphery of cage means 19 and the inner periphery of counterbore 32 defines a flow channel as at 52, thus, one of the design parameters involves the utilization of an annular zone having a greater area than area of bore 53.

For in-service repair or modification, it will be appreciated that the valve housing may be readily disassembled, and any repair parts needed easily inserted therein. Also, appropriate control of pressure response parameters may be achieved by merely measuring the compressive force on spring 17 while clamping nut 36 is being turned onto the outer periphery of tubular member 25.

Figure 2:
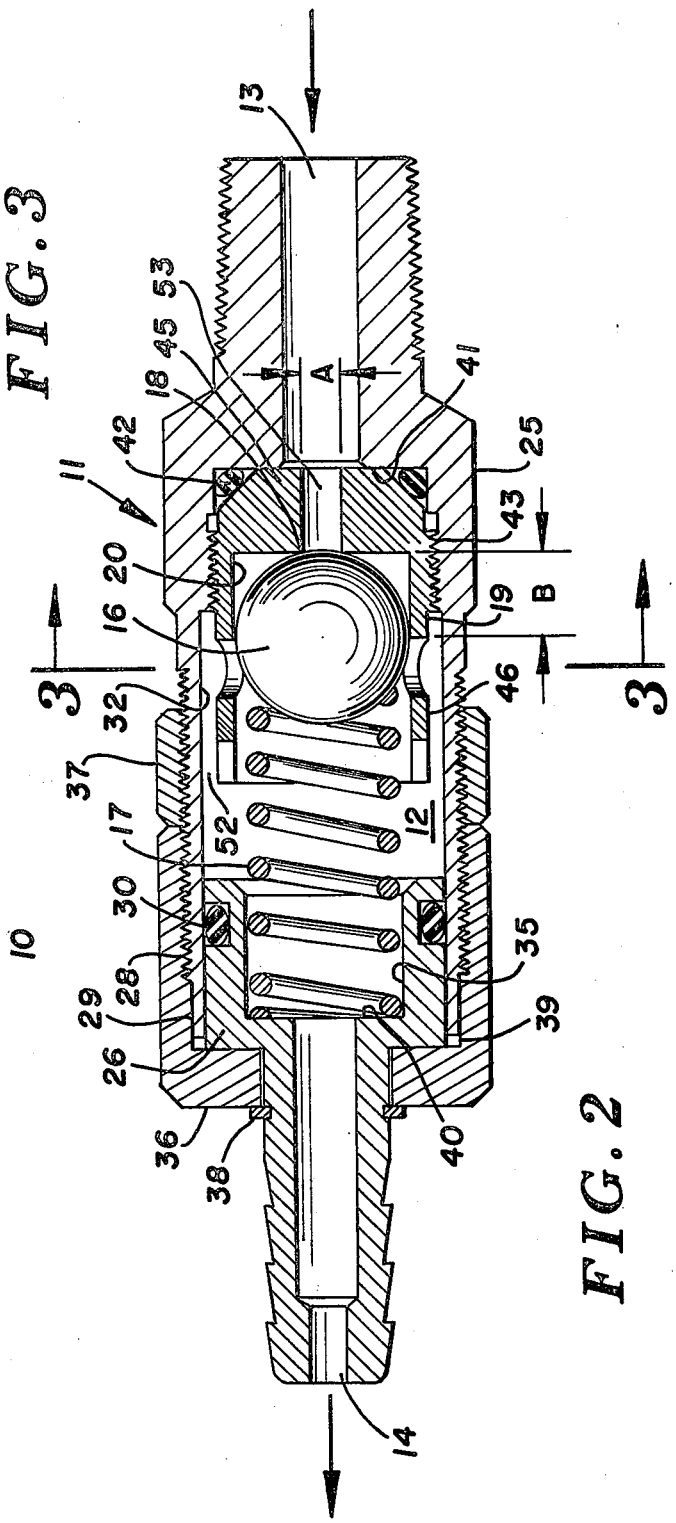
FIG. 2 is a diametrical sectional view taken along the line and in the direction of the arrows 2—2 of FIG. 1.

In order to achieve a greater degree of flexibility in a product line, particularly with regard to pressure response, it may be desirable, in certain instances, to utilize a ball-check 16 having a radius which is substantially less than the dimension B in FIG. 2. Thus, it may be helpful to have ball-check 16 move a certain predetermined distance prior to the opening of any of the metering orifices 47-50.

In order to achieve a greater versatility in overall design, it may be desirable to utilize tubular members 25 and 26 having significantly different axial dimensions, thus making it possible to controllably modify the overall length of the valve by selective modification of the telescopic engagement.

By way of materials of construction, the metering valve of the present invention may be fabricated from any suitable material of construction, including, metal such as iron, steel, brass, or also from certain synthetic plastic polytetrafluoroethylene, or the like.

I claim:

1. In a pressure limiting valve assembly comprising, in combination, a valve housing defining a chamber, an inlet and an outlet in communication with said chamber, and a ball-check member with spring means biasing said ball-check into contact with a seat adjacent said inlet; cage means disposed within said housing and having a check member confining chamber for operatively retaining said check member therewithin; said housing including:
 a. first and second generally cylindrical tubular members, each having opposed inner and outer ends, and with the inner ends thereof being telescopically engaged, one with the other, and with a bore extending through said tubular members;
 b. an inlet with a certain diameter formed at the outer end of said first cylindrical tubular member, and a counterbore extending toward said inlet from the opposed inner end thereof and terminating at an annular surface;
 c. an outlet formed at the outer end of said second cylindrical tubular member, and with a counterbore extending toward said outlet from the inner end thereof terminating at a step abutment;
 d. clamping means for adjustably retaining said first and second tubular members in telescopically engaged relationship for an adjustably selected axial length along the common inner ends thereof;
 e. cage means threadedly received within said counterbore of said first cylindrical tubular member and having a generally cup-shaped body comprising a base having side walls extending therefrom and with a generally open top and with a bore extending through the base thereof, said bore having a diameter which does not exceed the diameter of said inlet and terminating in a valve seat at the inner end thereof, at least one metering bore formed in the walls of said cup-shaped body and being disposed at a predetermined distance from said valve seat;
 f. a ball-check disposed within said cup-shaped body and having a radius which is less than said predetermined distance; and
 g. resilient bias means having one end disposed against said step abutment and normally applying a force urging said check member into contact with said seat with the magnitude of said force being controlled by the axial length of said housing.

2. The pressure limiting valve assembly as defined in claim 1 being particularly characterized in that the radius of said ball-check is substantially less than the predetermined distance between said metering bore and said valve seat, and wherein the area of said metering bore increases with increasing distance from said valve seat.

3. The pressure limiting valve assembly as defined in claim 1 being particularly characterized in that said second generally cylindrical tubular member is telescopically received within the inner periphery of said first generally cylindrical tubular member.

4. The pressure limiting valve assembly as defined in claim 3 being particularly characterized in that the axial length of said housing is greater than the length of said first generally cylindrical tubular member.

5. The pressure limiting valve assembly as defined in claim 1 being particularly characterized in that annular locking means are provided for releasably securing said first and second generally cylindrical tubular members together in telescopically engaged relationship.

6. The pressure limiting valve assembly as defined in claim 1 being particularly characterized in that seal means are provided along said annular surface between the base of said cage means and the said annular surface of said first generally cylindrical tubular member.

7. The pressure limiting valve assembly as defined in claim 1 being particularly characterized in that the counterbore formed in said second tubular member terminates in an abutment step, and wherein said resilient bias means is a helically wound spring having one end thereof seated on said abutment, and with the other end thereof being in contact with said ball-check.

8. The pressure limiting valve assembly as defined in claim 1 being particularly characterized in that said cage means is provided with a plurality of metering bores, each being disposed an arcuate distance of 90° from its neighbor.

9. The pressure limiting valve assembly as defined in claim 1 being particularly characterized in that the outer diameter of said ball-check and the inner diameter of said cage means define an annular flow channel therebetween, with the area of said flow channel being no greater than the area of said bore formed in the base of said cage means.

* * * * *

UNITED STATES PATENT OFFICE
CERTIFICATE OF CORRECTION

PATENT NO. : 3,894,556

DATED : July 15, 1975

INVENTOR(S) : Ramon Pareja

It is certified that error appears in the above-identified patent and that said Letters Patent are hereby corrected as shown below:

Column 4, line 60, after the word "plastic" insert -- resin materials such as, for example, nylon, molded --.

Signed and Sealed this sixteenth Day of September 1975

[SEAL]

Attest:

RUTH C. MASON
*Attesting Officer*

C. MARSHALL DANN
*Commissioner of Patents and Trademarks*